United States Patent
Wei et al.

(10) Patent No.: US 12,333,714 B2
(45) Date of Patent: Jun. 17, 2025

(54) ESTIMATION OF B-VALUE IN PROSTATE MAGNETIC RESONANCE DIFFUSION WEIGHTED IMAGES

(71) Applicant: MERATIVE US L.P., Ann Arbor, MI (US)

(72) Inventors: Wen Wei, Orsay (FR); Giovanni John Jacques Palma, Orsay (FR); Amin Katouzian, Cambridge, MA (US)

(73) Assignee: Merative US L.P., Ann Arbor, MI (US)

( * ) Notice: Subject to any disclaimer, the term of this patent is extended or adjusted under 35 U.S.C. 154(b) by 628 days.

(21) Appl. No.: 17/546,806

(22) Filed: Dec. 9, 2021

(65) Prior Publication Data
US 2023/0186463 A1     Jun. 15, 2023

(51) Int. Cl.
*G06N 3/0442*     (2023.01)
*G06N 3/044*     (2023.01)
(Continued)

(52) U.S. Cl.
CPC ........... *G06T 7/0012* (2013.01); *G06N 3/044* (2023.01); *G06T 7/10* (2017.01); *G06V 10/22* (2022.01);
(Continued)

(58) Field of Classification Search
None
See application file for complete search history.

(56) References Cited

U.S. PATENT DOCUMENTS

| 6,670,812 B1 * | 12/2003 | Mock ............... G01R 33/56341 324/309 |
| 2012/0280686 A1 | 11/2012 | White et al. |

(Continued)

FOREIGN PATENT DOCUMENTS

| CN | 111028206 | * | 4/2020 | ............... G06T 7/00 |
| CN | 111028206 A | | 4/2020 | |

(Continued)

OTHER PUBLICATIONS

"Image segmentation of plexiform neurofibromas from a deep neural network using multiple b-value diffusion data", Chang et al, 2020, Scientific Reports 10, 17857 (2020). https://doi.org/10.1038/s41598-020-74920-1 (Year: 2020).*

(Continued)

*Primary Examiner* — Beniyam Menberu
(74) *Attorney, Agent, or Firm* — Michael Best & Friedrich LLP

(57) ABSTRACT

Methods and systems of estimating b-values. One system including an electronic processor configured to receive a set of medical images associated with a patient, where the set of medical images are diffusion-weighted images. The electronic processor is also configured to extract a set of patches from each medical image included in the set of medical images. The electronic processor is also configured to determine, via an estimation model trained using machine learning, a set of estimated b-values, where each estimated b-value is associated with a patch included in the set of patches. The electronic processor is also configured to determine a b-value for each of the medical images included in the set of medical images, where the b-value is based on the set of estimated b-values.

16 Claims, 6 Drawing Sheets

(51) Int. Cl.
  *G06T 7/00* (2017.01)
  *G06T 7/10* (2017.01)
  *G06V 10/22* (2022.01)
  *G06V 10/764* (2022.01)
(52) U.S. Cl.
  CPC .. *G06V 10/764* (2022.01); *G06T 2207/10088* (2013.01); *G06T 2207/20081* (2013.01); *G06T 2207/30081* (2013.01)

(56) References Cited

U.S. PATENT DOCUMENTS

| | | |
|---|---|---|
| 2015/0260816 A1 | 9/2015 | Liang |
| 2017/0156630 A1 | 6/2017 | Gabr et al. |
| 2017/0231550 A1 | 8/2017 | Do et al. |
| 2018/0049665 A1* | 2/2018 | Jeong ............... A61B 5/055 |
| 2018/0306882 A1 | 10/2018 | Li et al. |
| 2020/0012761 A1 | 1/2020 | El-Baz et al. |
| 2020/0193244 A1 | 6/2020 | Zhou et al. |
| 2020/0285714 A9 | 9/2020 | El-Baz et al. |
| 2021/0098113 A1 | 4/2021 | Sorenson et al. |
| 2021/0110532 A1 | 4/2021 | Braman et al. |
| 2021/0248736 A1 | 8/2021 | Kamen et al. |
| 2023/0053434 A1* | 2/2023 | Malyarenko ......... A61B 5/4842 |

FOREIGN PATENT DOCUMENTS

| | | | | |
|---|---|---|---|---|
| CN | 111445553 | * | 7/2020 | ............ G06T 3/00 |
| KR | 10-2019-0021958 A | | 3/2019 | |
| WO | WO 2010116124 | * | 10/2010 | ....... G01R 33/56341 |
| WO | WO 2017221654 | * | 12/2017 | ............. A61B 5/055 |
| WO | WO 2018210233 | * | 11/2018 | ............... G06T 7/00 |

OTHER PUBLICATIONS

Kamphenkel et al "Domain Adaptation for Deviating Acquisition Protocols in CNN-based Lesion Classification on Diffusion-Weighted MR Images", Division of Medical Image Computing, German Cancer Research Center, arXiv:1807.06277v1 [cs.CV] Jul. 17, 2018 pp. 1-8 (Year: 2018).*
Freiman et al., "Improved multi b-value Diffusion-Weighted MRI of the body by Simultaneous Model Estimation and Image Reconstruction (SMEIR)," International Conference on Medical Image Computing and Computer-Assisted Intervention, 2013, 1-8.
Hectors et al., "Advanced Diffusion-weighted Imaging Modeling for Prostate Cancer Characterization: Correlation with Quantitative Histopathologic Tumor Tissue Composition—A Hypothesis-generating Study," Radiology, 2018, 286(3):918-928.
Sun et al., "Voxel-wise prostate cell density prediction using multiparametric magnetic resonance imaging and machine learning," Acta Oncologica, 2018, 57(11): 1540-1546.
Yu et al., "Synthesis of Prostate MR Images for Classification Using Capsule Network-Based GAN Model," Sensors, 2020, 20(20): 5736.
International Search Report and Written Opinion for Application No. PCT/US2022/081262 dated Apr. 27, 2023 (10 pages).

* cited by examiner

ESTIMATION OF B-VALUE IN PROSTATE MAGNETIC RESONANCE DIFFUSION WEIGHTED IMAGES

FIELD

Embodiments described herein generally relate to estimating b-values medical images and, in particular, estimating b-values in prostate magnetic resonance diffusion weighted images.

SUMMARY

The b-value is a factor that reflects the strength and timing of gradients used to generate diffusion-weighted images (DWIs). DWIs are a form of magnetic resonance imaging (MRI) based upon measuring the random Brownian motion of water molecules within a voxel (for example, a three-dimensional analog of a pixel or volume pixel) of tissue. The higher the b-value, the stronger the diffusion effects. A high b-value (for example, a b-value greater than or equal to 1400 s/mm$^2$) DWI provides valuable information about clinically significant prostate cancers and is assessed, during radiology interpretation, along with apparent diffusion coefficient (ADC) maps and T2 weighted images for inferring prostate imaging reporting and data system (PIRADS) scores. However, acquiring a high b-value DWI is challenging as it leads to, among other things, decreased signal-to-noise ratio (SNR), increased scan time, missed lesions, and the like.

Synthesizing high b-value DWIs by using at least two DWIs with two different b-values may overcome the challenges described above. However, there is no standard DICOM tag to store b-value information and, in some instances, b-value information may be missing. To solve these and other problems, embodiments described herein provide methods and systems for estimating b-values in medical images, including, for example, prostate magnetic resonance diffusion weighted images (MR-DWIs).

For example, one embodiment provides a system of estimating b-values. The system including an electronic processor configured to receive a set of medical images associated with a patient, where the set of medical images are diffusion-weighted images. The electronic processor is also configured to extract a set of patches from each medical image included in the set of medical images. The electronic processor is also configured to determine, via an estimation model trained using machine learning, a set of estimated b-values, where each estimated b-value is associated with a patch included in the set of patches. The electronic processor is also configured to determine a b-value for each of the medical images included in the set of medical images, where the b-value is based on the set of estimated b-values.

Another embodiment provides a method of estimating b-values. The method includes receiving, with an electronic processor, a set of medical images associated with a patient, wherein the set of medical images are diffusion-weighted images. The method also includes extracting, with the electronic processor, a set of patches for each medical image included in the set of medical images. The method also includes determining, with the electronic processor, via an estimation model trained using machine learning, a set of estimated b-values, wherein each estimated b-value is associated with a patch included in the set of patches. The method also includes determining, with the electronic processor, a b-value for each of the medical images included in the set of medical images, wherein the b-value is based on the set of estimated b-values.

Another embodiment provides a non-transitory, computer-readable medium storing instructions that, when executed by an electronic processor, perform a set of functions. The set of functions includes receiving a set of medical images associated with a patient, wherein the set of medical images are diffusion-weighted images. The set of functions also includes extracting a set of patches from each medical image included in the set of medical images. The set of functions also includes determining, via an estimation model trained using machine learning, a set of estimated b-values, wherein each estimated b-value is associated with a patch included in the set of patches. The set of functions also includes determining a b-value for each of the medical images included in the set of medical images, wherein the b-value is based on the set of estimated b-values.

Other aspects of the embodiments described herein will become apparent by consideration of the detailed description and accompanying drawings.

Figure 1:
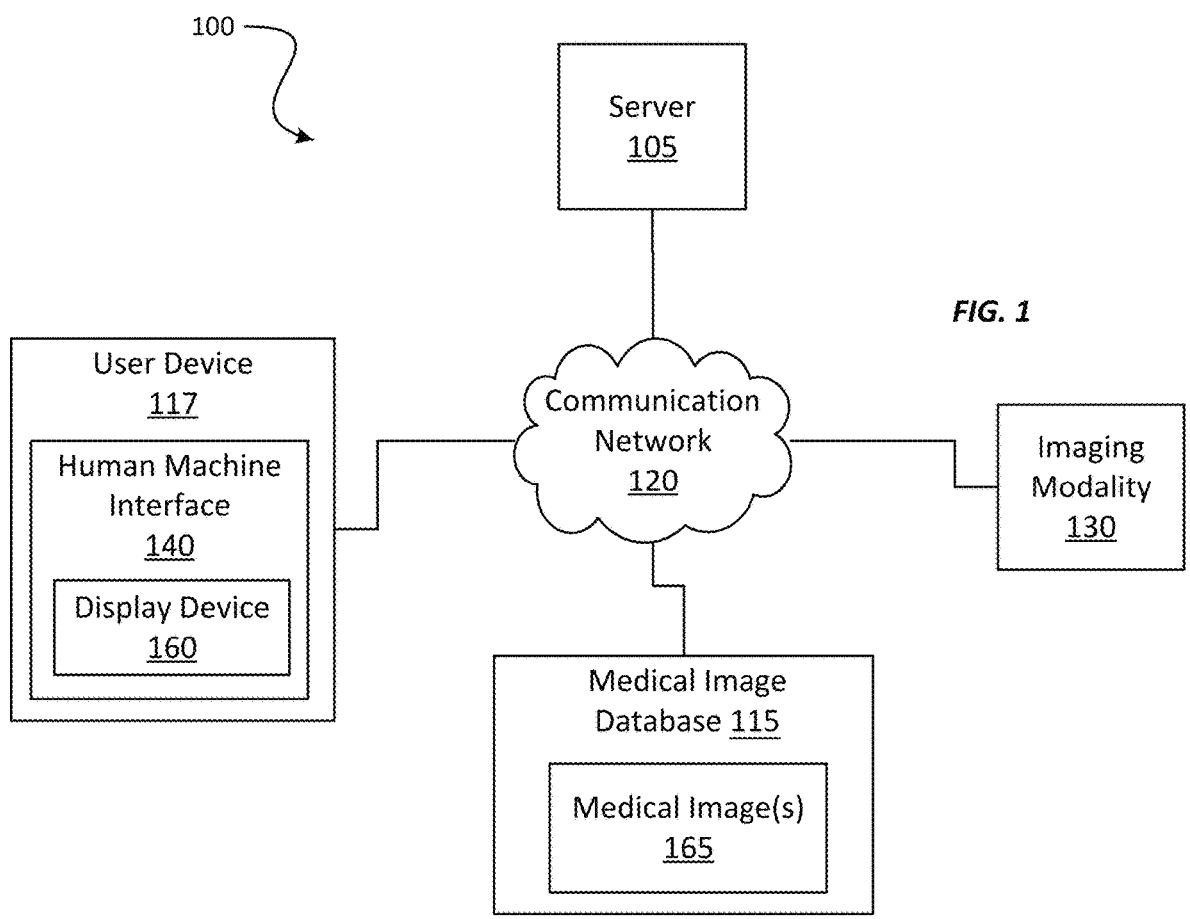
FIG. 1 illustrates a system for estimating b-values according to some embodiments.

Other aspects of the embodiments described herein will become apparent by consideration of the detailed description.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 schematically illustrates a system 100 for estimating b-values for medical images according to some embodiments. The system 100 includes a server 105, a medical image database 115, a user device 117, and an imaging modality 130. In some embodiments, the system 100 includes fewer, additional, or different components than illustrated in FIG. 1. For example, the system 100 may include multiple servers 105, medical image databases 115, user devices 117, imaging modalities 130, or a combination thereof.

The server 105, the medical image database 115, the user device 117, and the imaging modality 130 communicate over one or more wired or wireless communication networks 120. Portions of the communication network 120 may be implemented using a wide area network, such as the Internet, a local area network, such as a Bluetooth™ network or Wi-Fi, and combinations or derivatives thereof. Alternatively or in addition, in some embodiments, components of the system 100 communicate directly as compared to through the communication network 120. Also, in some embodiments, the components of the system 100 communicate through one or more intermediary devices not illustrated in FIG. 1.

Figure 2:
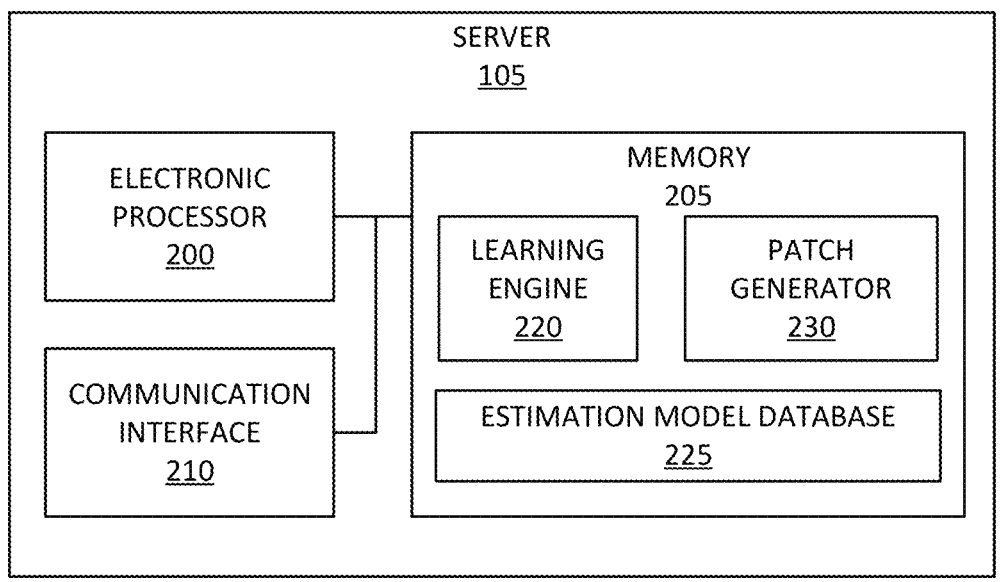
FIG. 2 illustrates a server included in the system of FIG. 1 according to some embodiments.

The server 105 is a computing device, which may server as a gateway for the medical image database 115. For example, in some embodiments, the server 105 may be a PACS server. Alternatively, in some embodiments, the server 105 may be a server that communicates with a PACS server to access the medical image database 115. As illustrated in FIG. 2, the server 105 includes an electronic processor 200, a memory 205, and a communication interface 210. The electronic processor 200, the memory 205, and the communication interface 210 communicate wirelessly, over one or more communication lines or buses, or a combination thereof. The server 105 may include additional components than those illustrated in FIG. 2 in various configurations. The server 105 may also perform additional functionality other than the functionality described herein. Also, the functionality (or a portion thereof) described herein as being performed by the server 105 may be distributed among multiple devices, such as multiple servers included in a cloud service environment. In addition, in some embodiments, the user device 117 may be configured to perform all or a portion of the functionality described herein as being performed by the server 105.

The electronic processor 200 includes a microprocessor, an application-specific integrated circuit (ASIC), or another suitable electronic device for processing data. The memory 205 includes a non-transitory computer-readable medium, such as read-only memory ("ROM"), random access memory ("RAM") (for example, dynamic RAM ("DRAM"), synchronous DRAM ("SDRAM"), and the like), electrically erasable programmable read-only memory ("EEPROM"), flash memory, a hard disk, a secure digital ("SD") card, another suitable memory device, or a combination thereof. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 may store a learning engine 220 and an estimation model database 225. In some embodiments, the learning engine 220 develops an estimation model (for example, a b-value estimation model) using one or more machine learning functions. Machine learning functions are generally functions that allow a computer application to learn without being explicitly programmed. In particular, a computer application performing machine learning functions (sometimes referred to as a learning engine) is configured to develop an algorithm based on training data. For example, to perform supervised learning, the training data includes example inputs and corresponding desired (for example, actual) outputs, and the learning engine progressively develops a model (for example, a estimation model) that maps inputs to the outputs included in the training data. Machine learning may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using all of these approaches, a computer program may ingest, parse, and understand data and progressively refine models for data analytics, including image analytics.

Accordingly, the learning engine 220 (as executed by the electronic processor 200) may perform machine learning using training data to develop an estimation model that performs b-value estimation with respect to one or more medical images (for example, the medical images stored in the medical image database 115). In other words, the estimation model predicts a b-value for a medical image (for example, an image level b-value). In some embodiments, the estimation models are long short-term memory (LSTM) based models, including, for example, bidirectional long short-term memory (BiLSTM) based models.

Estimation models generated by the learning engine 220 may be stored in the estimation model database 225. As illustrated in FIG. 2, the estimation model database 225 is included in the memory 205 of the server 105. It should be understood that, in some embodiments, the estimation model database 225 is included in a separate device accessible by the server 105 (included in the server 105 or external to the server 105).

As seen in FIG. 2, the memory 205 also includes a patch generator 230. In some embodiments, the patch generator 230 is a software application executable by the electronic processor 200. As described in more detail below, the electronic processor 200 executes the patch generator 230 to generate a patch for each voxel included in the medical image (as a set of patches associated with the medical image). In some embodiments, each patch is centered at a voxel included in a medical image. The patches generated by the patch generator 230 may be used as input data for the estimation model(s) stored in the estimation model database 225. As described in greater detail below, the electronic processor 200 may receive a medical image, such as a diffusion-weighted image (DWI). The electronic processor 200 (via the patch generator 230) may analyze the received medical image and determine a set of patches for the medical image, where each patch is centered at a voxel of the medical image.

The communication interface 210 allows the server 105 to communicate with devices external to the server 105. For example, as illustrated in FIG. 1, the server 105 may communicate with the medical image database 115, the user device 117, the imaging modality 130, or a combination thereof through the communication interface 210. In particular, the communication interface 210 may include a port for receiving a wired connection to an external device (for example, a universal serial bus ("USB") cable and the like), a transceiver for establishing a wireless connection to an external device (for example, over one or more communication networks 120, such as the Internet, local area network ("LAN"), a wide area network ("WAN"), and the like), or a combination thereof.

The user device 117 is also a computing device and may include a desktop computer, a terminal, a workstation, a laptop computer, a tablet computer, a smart watch or other wearable, a smart television or whiteboard, or the like. Although not illustrated, the user device 117 may include similar components as the server 105 (an electronic processor, a memory, and a communication interface). The user device 117 may also include a human-machine interface 140 for interacting with a user. The human-machine interface 140 may include one or more input devices, one or more output devices, or a combination thereof. Accordingly, in some embodiments, the human-machine interface 140 allows a user to interact with (for example, provide input to and receive output from) the user device 117. For example, the human-machine interface 140 may include a keyboard, a cursor-control device (for example, a mouse), a touch screen, a scroll ball, a mechanical button, a display device (for example, a liquid crystal display ("LCD")), a printer, a speaker, a microphone, or a combination thereof. As illustrated in FIG. 1, in some embodiments, the human-machine interface 140 includes a display device 160. The display device 160 may be included in the same housing as the user device 117 or may communicate with the user device 117 over one or more wired or wireless connections. For example, in some embodiments, the display device 160 is a touchscreen included in a laptop computer or a tablet computer. In other embodiments, the display device 160 is a monitor, a television, or a projector coupled to a terminal, desktop computer, or the like via one or more cables.

Additionally, in some embodiments, to communicate with the server 110, the user device 117 may store a browser application or a dedicated software application executable by an electronic processor of the user device 117. The system 100 is described herein as providing a b-value estimation and an image analysis service through the server 110, including, for example, lesion detection, lesion segmentation, lesion classification, and the like using estimated b-values. However, in other embodiments, the functionality (or a portion thereof) described herein as being performed by the server 110 may be locally performed by the user device 117. For example, in some embodiments, the user device 117 may store the learning engine 220, the estimation model database 225, the patch generator 230, or a combination thereof.

The medical image database 115 stores a plurality of medical images 165 (or a set of medical images 165). In some embodiments, the medical image database 115 is combined with the server 105. Alternatively or in addition, the medical images 165 may be stored within a plurality of databases, such as within a cloud service. Although not illustrated in FIG. 1, the medical image database 115 may include components similar to the server 105, such as an electronic processor, a memory, a communication interface, and the like. For example, the medical image database 115 may include a communication interface configured to communicate (for example, receive data and transmit data) over the communication network 120.

The medical images 165 stored in the medical image database 115 may include a variety of classifications or types. For example, the medical images 165 may include anatomical images, such as a lateral chest radiograph, a PA chest radiograph, and the like (associated with an organ of a patient). In some embodiments, the medical images 165 are diffusion-weighted images with unknown b-values. Alternatively or in addition, in some embodiments, the medical images 165 (or a subset thereof) include medical images associated with estimated final or image-level b-values (for example, as predicted or estimated by the server 105). In some embodiments, a memory of the medical image database 115 stores the medical images 165 and associated data (for example, reports, metadata, and the like). For example, the medical image database 115 may include a picture archiving and communication system ("PACS"), a radiology information system ("RIS"), an electronic medical record ("EMR"), a hospital information system ("HIS"), an image study ordering system, and the like.

The imaging modality 130 provides imagery (for example, the medical images 165). The imaging modality 130 may include a computed tomography (CT), a magnetic resonance imaging (MRI), an ultrasound (US), another type of imaging modality, or a combination thereof. While the embodiments described herein are generally described in the context of radiology or urology medical images (such as, for example, prostate-related medical images), it should be understood that other images, such as pathology images, including gross specimen photos, microscopy slide images, and whole scanned slide datasets, may also be used. Other images, such as dermatology, intra-operative or surgery, or wound care photos or movies, may also be used. In some embodiments, the medical images 165 are transmitted from the imaging modality 130 to a PACS Gateway (for example, the server 105). Alternatively or in addition, in some embodiments, the medical images 165 are transmitted from the imaging modality 130 to the medical image database 115.

A user may use the user device 117 to access and view the medical images 165 and interact with the medical images 165. For example, the user may access the medical images 165 from the medical image database 115 (through a browser application or a dedicated application stored on the user device 117 that communicates with the server 105) and view the medical images 165 on the display device 160 associated with the user device 117. Alternatively or in addition, the user may access and interact with medical images associated with estimated final or image-level b-values. A user may interact with the medical images 165 (including medical images associated with estimated b-values) by performing an image analysis on the medical images 165, including, for example, lesion detection, lesion segmentation, lesion classification, or the like.

As noted above, a high b-value (for example, a b-value greater than or equal to 1400 s/mm$^2$) DWI provides valuable information about clinically significant prostate cancers. However, acquiring a high b-value DWI is challenging as it leads to, among other things, decreased signal-to-noise ratio (SNR), increased scan time, missed lesions, and the like. To solve these and other problems, the system 100 is configured to estimate b-values in medical images 165, including, for example, in prostate magnetic resonance diffusion weighted images (MR-DWIs). In particular, in some embodiments, the methods and systems described herein synthesize high b-value DWIs by using at least two DWIs with different b-values to overcome the challenges described above. Additionally, as also noted above, automatic identification or estimation of b-values may be used for DWI extrapolation.

Figure 3:
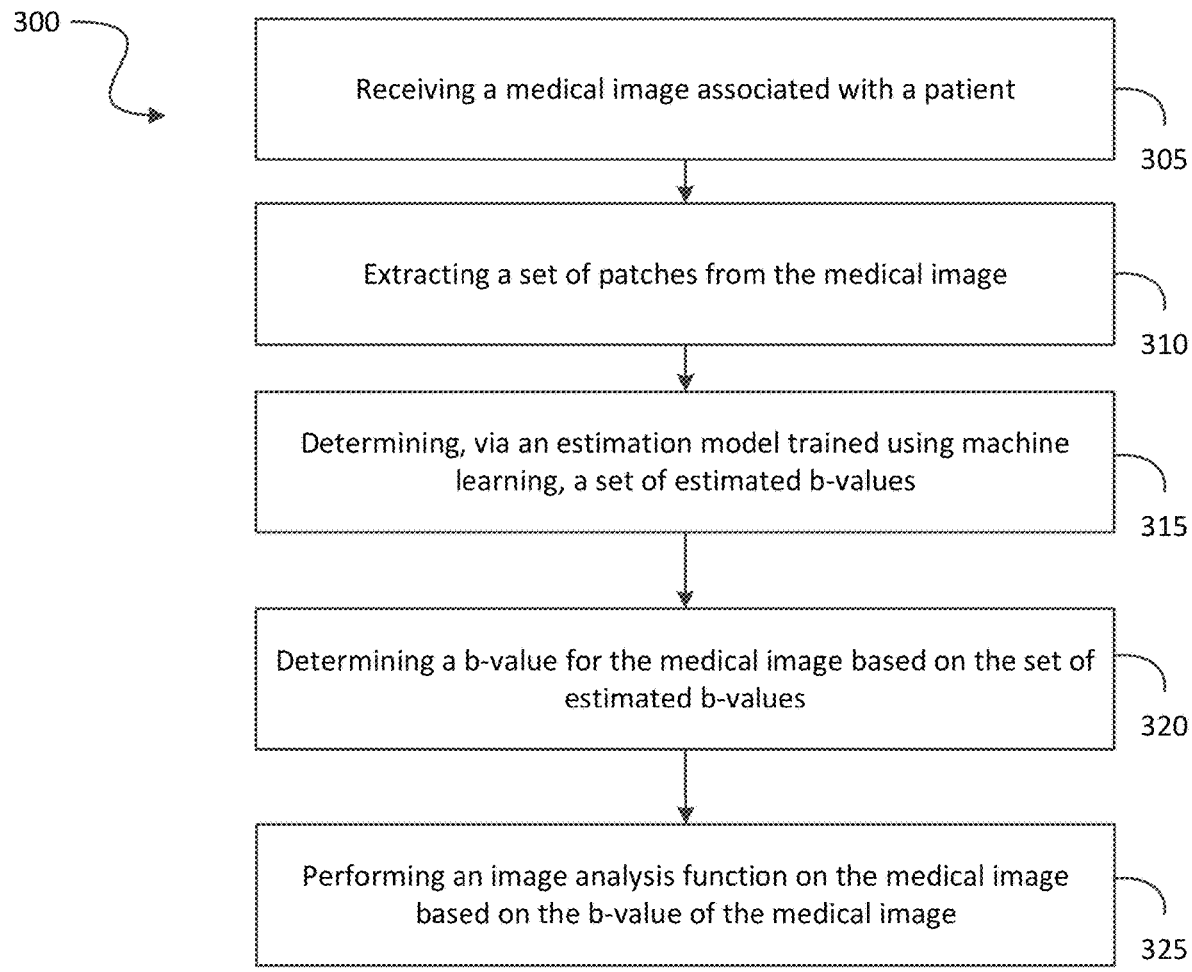
FIG. 3 illustrates a method for estimating b-values using the system of FIG. 1 according to some embodiments.

For example, FIG. 3 is a flowchart illustrating a method 300 for estimating b-values for medical images 165 according to some embodiments. The method 300 is described herein as being performed by the server 105 (the electronic processor 200 executing instructions). However, as noted above, the functionality performed by the server 105 (or a portion thereof) may be performed by other devices, including, for example, the user device 117 (via an electronic processor executing instructions).

As illustrated in FIG. 3, the method 300 includes receiving, with the electronic processor 200, a medical image 165 associated with a patient (at block 305). The medical image 165 is associated with an organ of the patient (for example, an anatomical image of an organ of the patient). For example, in some embodiments, the medical image 165 is a DWI of a prostate associated with a patient (for example, a prostate DWI). As noted above, in some embodiments, the medical image database 115 stores the medical images 165. In such embodiments, the electronic processor 200 receives the medical image 165 from the medical image database 115 over the communication network 120. Alternatively or in addition, the medical image 165 may be stored in another storage location, such as the memory of the user device 117. Accordingly, in some embodiments, the electronic processor 200 receives the medical image 165 from another storage location (for example, the memory of the user device 117). Alternatively or in addition, in some embodiments, the electronic processor 200 receives the medical image 165 directly from the imaging modality 130 over the communication network 120. In such embodiments, the electronic processor 200 may (automatically) receive the medical image 165 upon completion of an imaging scan (including the medical image 165) of the patient by the imaging modality 130.

After receiving the medical image 165 (at block 305), the electronic processor 200 extracts a set of patches from the medical image 165 (at block 310). In some embodiments, the electronic processor 200 extracts the patch(es) using the patch generator 230. As noted above, the electronic processor 200 executes the patch generator 230 to generate a patch for each voxel included in the medical image 165. In some embodiments, each patch extracted from the medical image 165 is centered at a voxel of the medical image 165. Accordingly, in some embodiments, the electronic processor 200 extracts a patch for each voxel of the medical image 165. In some embodiments, a size of a patch varies and depends on a memory size or parameters. Alternatively or in addition, in some embodiments, a number of patches extracted varies and depends on available memory space or parameters.

After extracting the set of patches from the medical image 165 (at block 310), the electronic processor 200 determines a set of estimated b-values for the medical image 165 based on the set of patches (at block 315). Each estimated b-value may be associated with a patch included in the set of patches. As noted above, the set of patches generated by the patch generator 230 may be used as input data for the estimation model(s) stored in the estimation model database 225. Accordingly, in some embodiments, the electronic processor 200 accesses one or more estimation models from the estimation model database 225 and applies the estimation model(s) to the set of patches (for example, feeds the set of patches to the estimation model(s) as input). As noted above, in some embodiments, the estimation model(s) are bidirectional LSTM models.

The electronic processor 200 then determines a b-value (for example, an estimated final or image-level b-value) for the medical image 165 based on the set of estimated b-values (at block 320). In some embodiments, the electronic processor 200 determines the b-value for the medical image 165 using a statistical function (for example, by performing a statistic or statistical analysis function) on the set of estimated b-values. For example, in some embodiments, the electronic processor 200 determines the b-value for the medical image 165 by generating a histogram of the set of estimated b-values and performing an analysis on the histogram (for example, a histogram analysis). The histogram may represent a distribution of estimated b-values (for example, the set of estimated b-values) for the medical image 165. In some embodiments, the electronic processor 200 performs the histogram analysis by determining a peak (or peak value) of the histogram(s). In such embodiments, the electronic processor 200 determine the b-value for the medical image 165 to be the peak (or peak value) of the histogram for the medical image 165. Alternatively or in addition, in some embodiments, the electronic processor 200 determines the b-value for the medical image 1675 by determining a mean b-value, a median b-value, a maximum b-value, or the like as the b-value for the medical image 165.

After determining the b-value for the medical image 165 (at block 320), the electronic processor 200 may perform an image analysis function on the medical image 165 using the b-value for the medical image 165 (at block 325). As noted above, the system 100 may provide an image analysis service through the server 110, including, for example, lesion detection, lesion segmentation, lesion classification, and the like. Accordingly, in some embodiments, the electronic processor 200 performs a detection function, a segmentation function, a classification function, an arbitrary b-value DWI image generation function, or the like using or based on the b-value for the medical image 165 (as the image analysis function) as part of providing the image analysis service. In some embodiments, the electronic processor 200 automatically performs the image analysis function in response to determining the b-value of the medical image 165.

Alternatively or in addition, after determining the b-value for the medical image 165 (at block 320), the electronic processor 200 may store the medical image 165 (including the b-value, for example, as metadata of the medical image 165). As one example, the electronic processor 200 may store the medical image 165 (including the b-value) in the memory 205. In some embodiments, the electronic processor 200 may store the medical image 165 (including the b-value) in another remote location, such as, for example, in the medical image database 225, a memory of the user device 117, or a combination thereof. Accordingly, in some embodiments, the electronic processor 200 transmits the medical image 165, the b-value of the medical image 165, or a combination thereof to a remote device. As one example, the electronic processor 200 may transmit the b-value of the medical image 165, the medical image 165, or a combination thereof to the user device 117 such that a user may access and interact with the b-value of the medical image 165, the medical image 165, or a combination thereof via the user device 117, such as, for example, performing an image analysis function on the medical image 165 using the b-value of the medical image 165.

Figure 4:
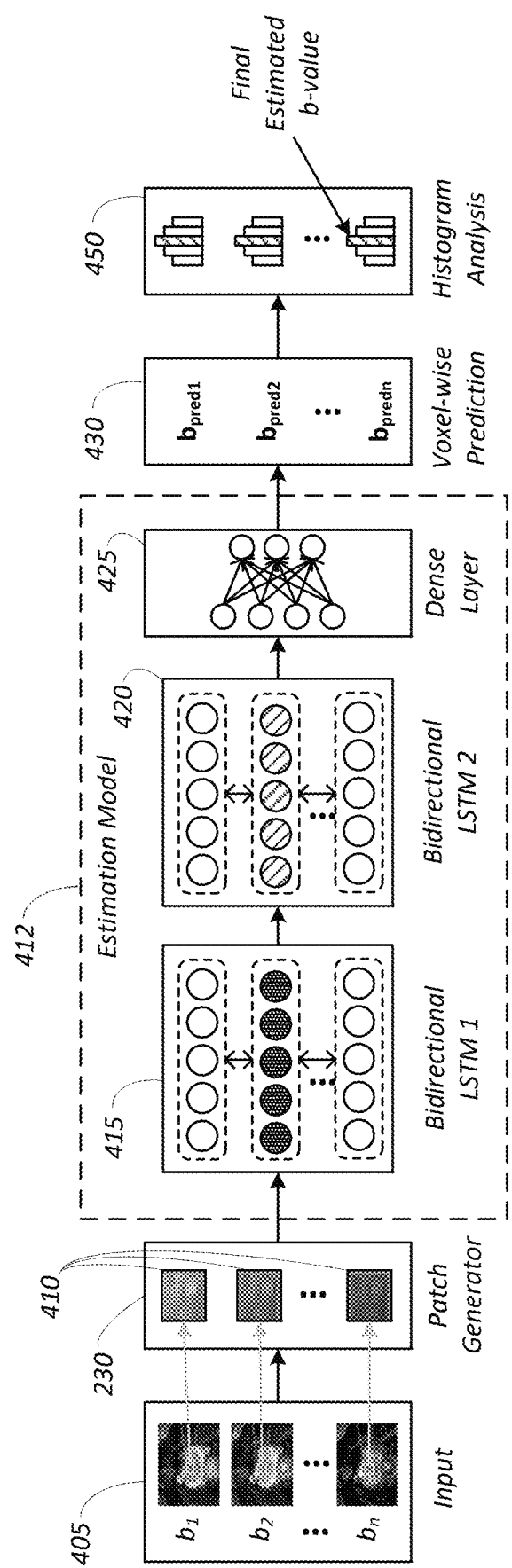
FIG. 4 illustrates an example implementation diagram of the method of FIG. 3 according to some embodiments.

FIG. 4 illustrates an example implementation diagram of the method 300. As illustrated in FIG. 4, the patch generator 230 receives a set of medical images 165 as input (represented in FIG. 4 by reference numeral 405). The b-values associated with the medical images 165 received by the patch generator 230 are unknown. In the illustrated example, the patch generator 230 extracts one or more patches 410 (for example, a set of patches) for each of the medical images 165. The extracted patches 410 are feed (or provided as input) to an estimation process (as a voxel-wise prediction process) (represented in FIG. 4 by reference numeral 412). In the illustrated example, of FIG. 4, the estimation process 412 (as executed by the electronic processor 200) includes a first Bidirectional LSTM component 415, a second Bidirectional LSTM component 420, and a dense layer component 425. In some embodiments, the estimation process 412 includes additional, fewer, or different components than illustrated in FIG. 4. As one example, the estimation process 412 may include additional or fewer Bidirectional LSTM components, dense layer components, or a combination thereof than illustrated in FIG. 4.

As a result of the estimation process 412, the electronic processor 200 determines a set of estimated b-values (represented in FIG. 4 by reference numeral 430) for each the medical image 165. As illustrated in FIG. 4, the electronic processor 200 then determines or generates a histogram for each medical image representing a distribution of the estimated b-values included in a set of estimated b-values 430 associated with each medical image (represented in FIG. 4 by reference numeral 450). After generating one or more histograms, the electronic processor 200 may then perform a histogram analysis on the histograms to determine a peak (or peak value) of each histogram. The electronic processor 200 may determine the estimated final or image-level b-value for each of the medical images 165 to be the peak value of the corresponding histogram.

Figure 5:
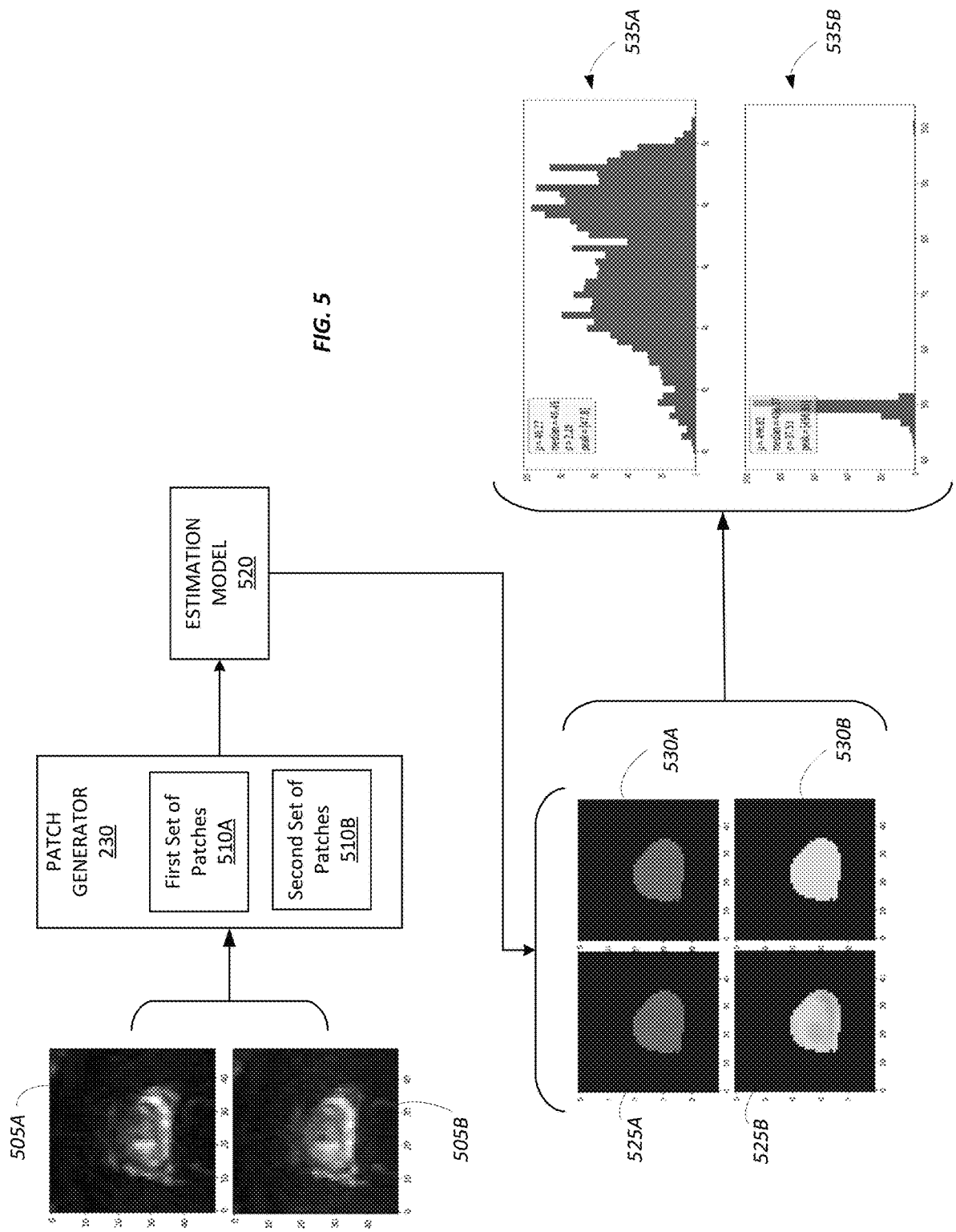
FIG. 5 illustrates an example use case of the method according to some embodiments.

FIG. 5 illustrates an example use case of applying the method 300 to two example medical images. As illustrated in FIG. 5, the electronic processor 200 may receive a first medical image 505A and a second medical image 505B (as input). The first medical image 505A and the second medical image 505B are provided as input to the patch generator 230. As noted above, the patch generator 230 extracts a set of patches for each medical image received as input. For example, as illustrated in FIG. 5, the patch generator 230 extracts a first set of patches 510A (associated with the first medical image 505A) and a second set of patches 510B (associated with the second medical image 505B). The first set of patches 510A and the second set of patches 510B are provided to the estimation model or process (represented in FIG. 5 by reference numeral 520). The estimation model or process 520 estimates or predicts an image-level b-value for each of the medical images (for example, the first medical image 505A and the second medical image 505B). FIG. 5 illustrates a first estimated b-value 525A for the first medical image 505A and a second estimated b-value 525B for the second medical image 505B. FIG. 5 also illustrates the actual b-values for the first medical image 505A and the second medical image 505B (for example, a first actual b-value 530A associated with the first medical image 505A and a second actual b-value 530B associated with the second medical image 505B). FIG. 5 further illustrates a first histogram 535A associated with the first medical image 505A and a second histogram 535B associated with the second medical image 505B. As illustrated in FIG. 5, a peak value (a first peak value) of the first histogram is 47.8 and a peak value (a second peak value) of the second histogram is 496.83. The actual b-value for the first medical image 505A is 50 s/mm$^2$ and the actual b-value for the second medical image 505B is 500 s/mm$^2$. Accordingly, as illustrated in FIG. 5, the method 300 provides a accurate method of estimating b-values for various medical images 165.

Figure 6:
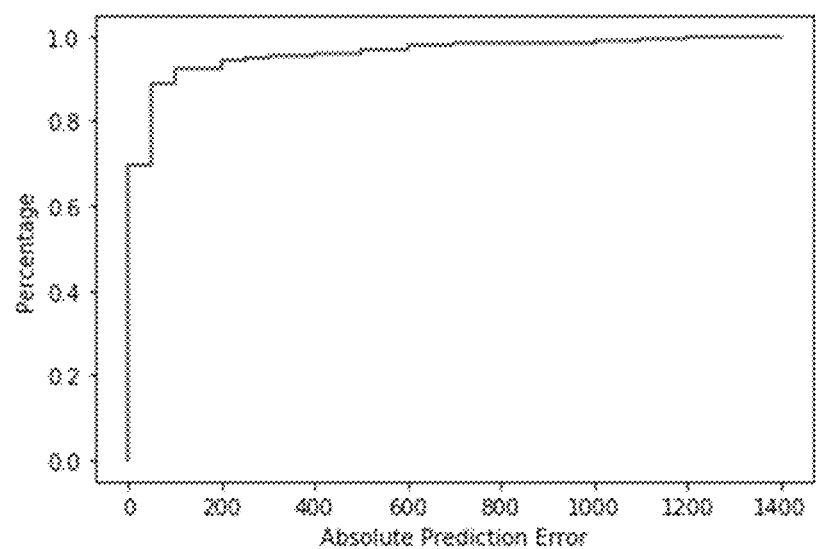
FIG. 6 is a graph illustrating a relationship between an absolute prediction error and a percentage according to some embodiments.

For example, FIG. 6 is a graph illustrating a relationship between an absolute prediction error and a percentage. For each medical image 165, a final estimated b-value (for example, the image-level b-value) was contrasted against the known b-value during acquisition. At the volume level, the mean absolute error was 53.55±175.53. No significant difference was observed between estimated and actual b-values (for example, p=0.86 by two-sided T-test). Across the different b-values, the overall prediction accuracy was 83.60% (±50). Accordingly, from the cumulative distribution of absolute prediction error, it was observed that 91.22% volumes have absolute prediction error smaller than 100 s/mm$^2$.

Synthesizing high b-value DWIs by using at least two DWIs with different b-values may overcome the challenges described above. However, there is no standard DICOM tag to store b-value information and, in some instances, b-value information may be missing. Accordingly, embodiments described herein provide methods and systems for estimating b-values in medical images, including, for example, prostate magnetic resonance diffusion weighted images (MR-DWIs). In particular, embodiments described herein estimate b-values by performing a voxel-wise prediction for the voxels within a prostate and performing a statistical analysis (such as, for example, a histogram analysis) for final image level b-value assignment. The voxel-wise prediction includes, given multi-b-value DWIs, extracting patches for each voxel within the prostate and feeding the extracted patches into BiLSTM based model to predict the b-value for each voxel. After performing the voxel-wise prediction, the embodiments described herein may then perform the histogram analysis for the final image level b-value assignment. The histogram analysis includes generating a histogram of estimated b-values for all of the voxels and assigning the identified b-value as the peak of the histogram. Additionally, the embodiments described herein enable bulk image processing. Accordingly, in some embodiments, the methods and systems described herein may be used to estimate b-values for multiple medical images simultaneously (or near simultaneously).

Various features and advantages of the embodiments described herein are set forth in the following claims.

What is claimed is:

1. A system of estimating b-values, the system comprising:

an electronic processor configured to
receive a set of medical images associated with a patient, wherein the set of medical images are diffusion-weighted images,
extract a set of patches from each medical image included in the set of medical images,
determine, via an estimation model trained using machine learning, a set of estimated b-values, wherein each estimated b-value is associated with a patch included in the set of patches,
determine a b-value for each of the medical images included in the set of medical images, wherein the determined b-value for each of the medical images is based on the set of estimated b-values, and
perform an image analysis function on the set of medical images based on the b-value for each of the medical images included in the set of medical images, wherein the image analysis function includes at least one selected from a group consisting of a segmentation function, a detection function, a classification function, and an arbitrary b-value DWI image generation function.

2. The system of claim 1, wherein the set of patches are extracted from an organ of interest of the patient.

3. The system of claim 1, wherein the estimation model is a long short-term memory model.

4. The system of claim 1, wherein the electronic processor is configured to determine the b-value for each of the medical images by performing a statistical analysis on the set of estimated b-values.

5. The system of claim 4, wherein the statistical analysis includes generating a histogram of the set of estimated b-values, wherein the b-value for each of the medical images is associated with a peak of the histogram.

6. The system of claim 1, wherein each patch included in the set of patches is centered at a voxel of each of the medical images.

7. A method of estimating b-values, the method comprising:
receiving, with an electronic processor, a set of medical images associated with a patient, wherein the set of medical images are diffusion-weighted images;
extracting, with the electronic processor, a set of patches for each medical image included in the set of medical images;
determining, with the electronic processor, via an estimation model trained using machine learning, a set of estimated b-values, wherein each estimated b-value is associated with a patch included in the set of patches;
determining, with the electronic processor, a b-value for each of the medical images included in the set of medical images, wherein the determined b-value for each of the medical images is based on the set of estimated b-values; and
performing an image analysis function on the set of medical images based on the b-value for each of the medical images included in the set of medical images, wherein performing the image analysis function includes performing at least one selected from a group consisting of a segmentation function, a detection function, a classification function, and an arbitrary b-value DWI image generation function.

8. The method of claim 7, wherein receiving the set of medical images includes receiving a medical image associated with a prostate of the patient.

9. The method of claim 7, wherein determining the set of estimated b-values includes determining the set of estimated b-values via a long short-term memory model.

10. The method of claim 7, wherein determining the b-value for each of the medical images includes performing a statistical analysis on the set of estimated b-values.

11. The method of claim 10, wherein determining the b-value for each of the medical images includes generating a histogram of the set of estimated b-values and performing an analysis of the histogram to determine a peak of the histogram.

12. The method of claim 11, wherein determining the b-value includes determining the b-value as the peak of the histogram.

13. A non-transitory, computer-readable medium storing instructions that, when executed by an electronic processor, perform a set of functions, the set of functions comprising:
receiving a set of medical images associated with a patient, wherein the set of medical images are diffusion-weighted images;
extracting a set of patches from each medical image included in the set of medical images;
determining, via an estimation model trained using machine learning, a set of estimated b-values, wherein each estimated b-value is associated with a patch included in the set of patches;
determining a b-value for each of the medical images included in the set of medical images, wherein the determined b-value for each of the medical images is based on the set of estimated b-values; and
performing an image analysis function on the set of medical images based on the b-value for each of the medical images included in the set of medical images, wherein performing the image analysis function includes performing at least one selected from a group consisting of a segmentation function, a detection function, a classification function, and an arbitrary b-value DWI image generation function.

14. The computer-readable medium of claim 13, wherein the set of functions further comprises:
generating a histogram of the set of estimated b-values; and
performing an analysis of the histogram to determine a peak of the histogram, wherein the b-value for each of the medical images is associated with the peak of the histogram.

15. The computer-readable medium of claim 13, wherein receiving the set of medical images includes receiving a medical image of a prostate of the patient.

16. The computer-readable medium of claim 13, wherein determining the set of estimated b-values includes determining the set of estimated b-values via a long short-term memory model.

* * * * *